Jan. 19, 1937.                L. H. KIRK                2,068,273
                         OPHTHALMIC MOUNTING
                          Filed June 5, 1935

Inventor:
Lloyd H. Kirk
By
Attorneys.

Patented Jan. 19, 1937

2,068,273

UNITED STATES PATENT OFFICE 2,068,273

OPHTHALMIC MOUNTING

Lloyd H. Kirk, Cranston, R. I., assignor to Martin-Copeland Company, Providence, R. I., a trustee-ship composed of Edgar W. Martin, E. Cornell Martin, Laurence C. Martin, and George W. Bleecker Application June 5, 1935, Serial No. 25,115

4 Claims. (Cl. 88—49)

The present invention relates to ophthalmic mountings and more particularly to an improved means for mounting nose-pads on spectacles or eyeglasses.

One object of the invention is to provide a novel means for mounting nose-pads on spectacles or eyeglasses which allows a limited rocking movement of the pad about a horizontal axis in the plane of the pad, a slight rocking movement about a vertical axis in the plane of the pad, but prevents any rotative movement of the pad about an axis normal to the plane of the pad.

Another object of the invention is to provide a drop-arm support on a spectacle or eyeglass bridge having a bifurcated end with the branches of the bifurcation forming a triangular-shaped aperture or closed loop for receiving a loop on the nose-pad and so constructed that the pad may have a limited pivotal movement about the apex end of the triangular-shaped aperture.

Another object of the invention is to provide a nose-pad mounting of the type indicated having a closed loop projecting from the side of the pad with means within the loop for engaging the support throughout its width to provide a connection which limits rocking movement of the pad about axes within the plane of the pad.

Still another object of the invention is to provide an ophthalmic mounting of the type indicated which is of simple construction, neat and ornamental in appearance, easier to adjust than similar mountings heretofore used, and capable of retaining its initial adjustment throughout long periods of use.

Further objects of the improvement are set forth in the following specification which describes a preferred form of construction of the invention, by way of example, as illustrated by the accompanying drawing. In the drawing.

Heretofore nose-pads have been either rigidly attached to supports extending from the spectacle or eyeglass bridge or have been mounted to swivel loosely on the supports. With rigidly mounted nose-pads it is difficult to adjust them with the accuracy necessary to prevent the edges from cutting the nose of the wearer. On the other hand, the loosely mounted or swiveled pads allow a rotation thereof about an axis normal to the plane of the pads. Because of this rotation the pads will not engage the nose of the wearer in the same position each time the spectacles or eyeglasses are applied which causes the lenses to be tilted at various angles with respect to the eyes. The present invention provides a novel connection for mouting the pads on droparm supports which permits a more accurate initial adjustment than is possible with the loose swivel-type mounting but, at the same time, allows a limited pivotal movement of the pads to adapt them to conform to the contour of the nose of the wearer. Further, with the novel structure of the present invention the nose-pads may be applied or replaced by an optician without the use of special tools or machines available only at the factories where the bridges or frames are made.

The novel structure of the present invention comprises interconnected closed loops on the pad and support which extend at right-angles to each other. The looped or apertured end of the drop-arm or other support is of triangular shape and formed by two cooperating branches which are separable to permit application and removal of the nose-pad. A lug or abutment is also provided within the loop on the nose-pad, the lug being formed with an inclined face having an edge for engaging the support throughout its width to allow only a slight lateral tilting of the nose-pad. The outer face of the lug is beveled or tapered longitudinally of the support to provide for a limited vertical tilting movement of the pad when applied to the nose of the wearer. With this improved form of construction the connection may be made sufficiently tight to prevent any rotative movement of the pad about an axis normal to the plane of the pad although providing for the necessary limited rocking movement of the pad about axes within the plane of the pad.

Figure 1:
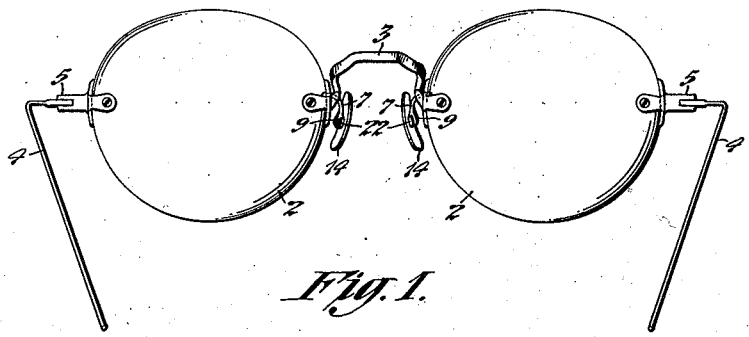
Fig. 1 illustrates a pair of spectacles of conventional style with the nose-guards or pads attached thereto by the present improved means.
Figure 2:
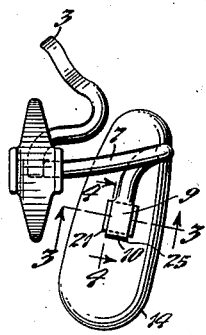
Fig. 2 is an enlarged view showing the nosepiece or bridge of the spectacles and illustrating one of the nose-pads attached to a drop-arm thereon by the present improved means.
Figure 3:
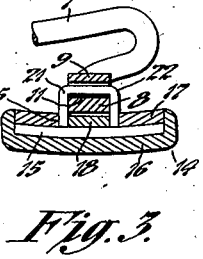
Fig. 3 is a detailed sectional view of the nosepad and its attaching means taken on line 3—3 of Fig. 2.
Figures 4, 5:
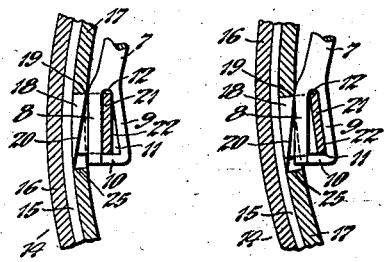
Fig. 4 is a detail sectional view of the same taken on line 4—4 of Fig. 2 and showing the nose-pad in one extreme position with respect to its support.
Fig. 5 is a view similar to Fig. 4 showing the nose-pad rocked to its opposite extreme position.
Figure 7:
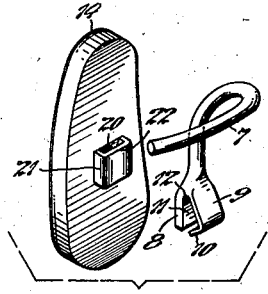
Fig. 7 is a composite perspective view of the drop-arm support and nose-pad in disassembled relationship.

Referring to the drawing, Fig. 1 illustrates a conventional type of rimless spectacles having lenses 2 connected by a bridge or nose-piece 3 and temples 4 hinged to the outer rims of the lenses by mountings 5. Extending rearwardly and then downwardly from opposite sides of the bridge 3 are a pair of curved arms 7 commonly called "drop-arms". The ends of the arms or supports 7 are split or bifurcated with one branch 8 of generally rectangular shape in cross-section and a similarly shaped branch 9 extending outwardly therefrom at a slight angle thereto with its end bent inwardly or provided with an abutment 10. The branch 9 is adapted to be bent from the open relationship shown in Fig. 7 to engage the inwardly-bent end or abutment 10 with the face of the branch 8 adjacent its end to form an enclosed triangular-shaped aperture or looped opening 11 having a relatively narrow apex end 12 as shown in Figs. 4 and 5.

Figure 6:
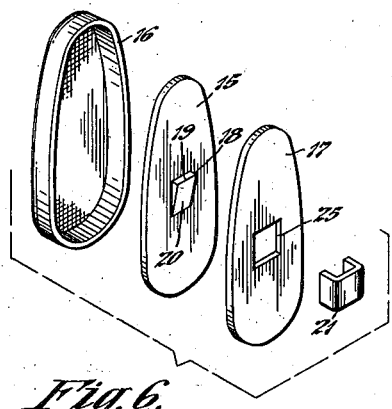
Fig. 6 is a composite perspective view showing the several parts of the nose-guard or pad in disassembled relationship.

The nose-pad 14 may take any desired form, being usually constructed with an inner metal plate or core 15 covered by a non-metallic shell which presents a smooth, slightly resilient surface to the nose of the wearer of the eyeglasses or spectacles. For this purpose the metal portion of the nose-pad may be sheathed with plastic material such as sold under the trade-mark "Celluloid" or "Zylonite". As illustrated in Fig. 6 of the present drawing, the metal plate 15 is of generally ovate or lenticular contour and adapted to receive a similarly shaped saucer-like shell 16 overlying one of its flat faces and enclosing its marginal rim. A cover 17 of the same non-metallic material is placed against the opposite face of the plate 15 with its edge enclosed within the rim of the shell 16 and cemented in place to provide a complete covering or sheath for the metal core. The cover 17 is provided with a rectangular opening 25 for a purpose as later explained.

In accordance with the present invention the metal core or plate 15 of the pad 14 is provided at its approximate center with a wedge-shaped lug or projection 18 of generally rectangular outline. The lug or projection 18 may be formed integral with or soldered or otherwise suitably secured to the face of the plate 15 and its raised portion is adapted to project into the opening 25 in the cover 17 when the latter is cemented in place within the rim of the shell 16. The transversely-extending edge 19 of the lug 18 will then be positioned flush with the outer face of the cover 17 with its beveled or tapered face 20 receding therefrom to the surface of the plate 15. A substantially U-shaped strap or band 21 is positioned on the plate 15 with its sides in overlying abutting relation to the sides of the lug 18 and soldered or otherwise secured thereto; it being understood that the strap 21 projects through the opening 25 in the cover 17. When thus assembled the resiliently covered pad 14 is provided with a closed loop 22 projecting outwardly from the rearward flat face thereof and having a rectangular-shaped inclined recess beneath the cross-bar of the loop, the recess being of gradually increasing depth due to the inclined face 20 of the lug.

The present invention contemplates a novel method of attaching the nose-pad to the drop-arm support which comprises inserting the crossbar of the looped band 21 between the branches 8 and 9 of the bifurcated end of the arm 7. When so applied the edge 19 of the lug 18 and the crossbar of the loop 22 closely embrace the rectangular branch 8 on the arm 7 with the side edge of the cross-bar of the loop 22 engaging the opposed faces of the branches 8 and 9 adjacent their point of joinder or apex end 12. The branch 9 is then bent or deformed to engage its inwardly-projecting end or abutment 10 with the side of the branch 8 adjacent the end of the latter to form the triangular-shaped aperture or opening 11 in which the crossbar of the loop 22 is received to attach the nose-pad to the arm 7. The inwardly-bent end or abutment 10 of the branch 9 lies closely adjacent the edge of the loop 22 opposite from that in engagement with the apex end 12 of the triangular-shaped aperture 11, as shown in Figs. 4 and 5, to prevent movement of the pad vertically of the support. Because of the relatively close fit of the crossbar of the loop 22 between the apex end 12 and abutment 10 and, further, because of the close fit of the relatively wide sides of the loop 22 with the side edges of the branch 8 throughout the length of the aperture or loop 11 on the support, the pad is prevented from rotative movement about an axis normal to the plane of the pads. However, a slight clearance between the transverse edge 19 of the lug 18 and the outer face of the branch 8 of the looped end of the arm 7 provides for a slight lateral rocking movement of the pad.

A limited but greater rocking movement of the pad longitudinally of the support is also permitted due to the engagement of the side edge of the loop 22 with the apex end 12 of the triangular-shaped aperture 11 which acts as a fulcrum for pivotal movement of the crossbar of the loop between the sides of the aperture. The beveled or tapered face 20 of the lug 18 provides a clearance to allow this pivotal movement of the nose-pad longitudinally of the support as shown in Fig. 5. Due to this construction and arrangement of the mounting for the nose-pad on the end of its support the pad is prevented from rotative movement about an axis normal to the plane of the pad while being permitted a limited pivotal movement about axes in the plane of the pad.

It will be observed from the foregoing that the present invention provides a particularly ingenious structure of ophthalmic mounting and a method of attaching nose-pads to their supports on eyeglasses or spectacles which can be accomplished without particular skill on the part of the operator.

It will further be observed that the present invention provides a simple construction and arrangement of elements which may be economically manufactured and easily and quickly assembled to provide a connection between the parts which allows a limited pivotal movement of the pad about axes within the plane of the pad but prevents rotative movement of the pad about an axis normal to the plane thereof. Because of this limited movement of the pads with respect to their supports the spectacles or eyeglasses may be accurately adjusted to the nose of the wearer and will retain their adjustment to properly position the eyeglasses or spectacles each time they are applied by the wearer. Due to their limited pivotal movement the pads are self-adjusting to more comfortably conform to the nose of the wearer.

While the device is herein shown and described as embodied in a preferred form of construction, various modifications may be made in the structure and arrangement of its parts without departing from the spirit or scope of the invention. Therefore, without limiting myself in this respect, I claim:

1. In an ophthalmic mounting for spectacles or eyeglasses, a support on the eyeglass bridge or spectacle frame having a triangular-shaped aperture adjacent its end, a nose-pad having a beveled lug on one side, and a substantially U-shaped strap extending through the aperture on the support with its ends secured to the sides of the lug to form a closed loop, said triangular-shaped aperture and beveled lug allowing a limited pivotal movement of the pad while preventing rotative movement thereof about an axis normal to the plane of the pad.

2. A nose-pad for attachment to an apertured support on an eyeglass bridge or spectacle frame comprising a metal plate, a beveled lug extending outwardly from the face of the plate, and a U-shaped strap embracing the lug with the sides of the strap fixed to the sides of the beveled lug to form a closed loop.

3. In an ophthalmic mounting for spectacles and eyeglasses, a drop-arm support on the eyeglass bridge or spectacle frame, an ovate nose-pad positioned with its longer axis substantially parallel to the drop-arm, and interengaging loops at the end of the drop-arm and on the rearward face of the nose-pad of corresponding triangular shape in longitudinal section, the edge of the loop on the pad engaging the apex end of the triangular-shaped loop on the support to pivot the pad for rocking movement on the support.

4. In an ophthalmic mounting for spectacles and eyeglasses, a drop-arm support on the eyeglass bridge or spectacle frame having a loop at its end of triangular shape in longitudinal section, a nose-pad positioned with its longer axis substantially parallel to the drop-arm and having a closed loop projecting from its rearward face and passing through the loop on the drop-arm support, one edge of the pad loop engaging the apex end of the triangular drop-arm loop, and the rearward face of the pad and its loop forming a triangular-shaped opening in longitudinal section of the pad to permit rocking of the pad about an axis at the apex end of the triangular-shaped loop on the drop-arm.

LLOYD H. KIRK.